May 6, 1952
V. I. WEIHE
2,595,315
DIRECTIONAL ANTENNA CONTROLLED CRAFT
POSITION PLOTTING DEVICE
Original Filed July 20, 1942
3 Sheets-Sheet 2
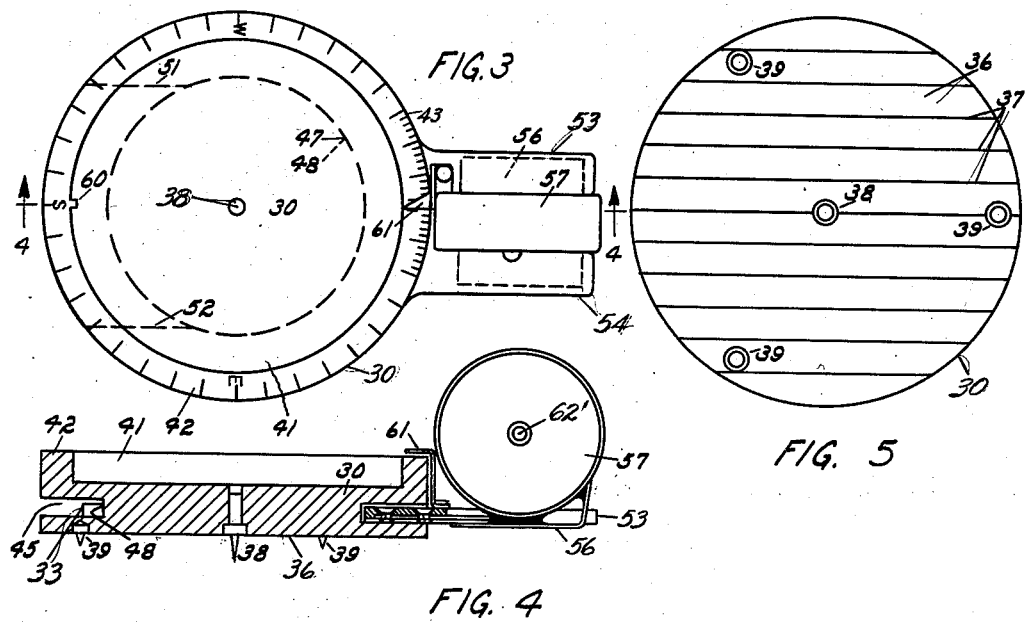
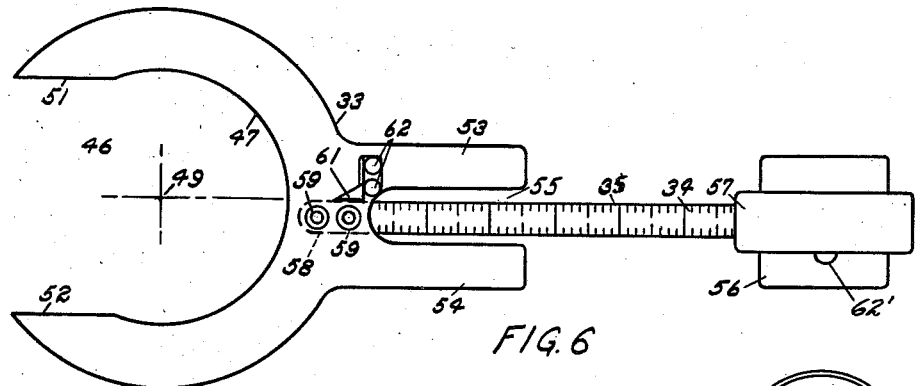
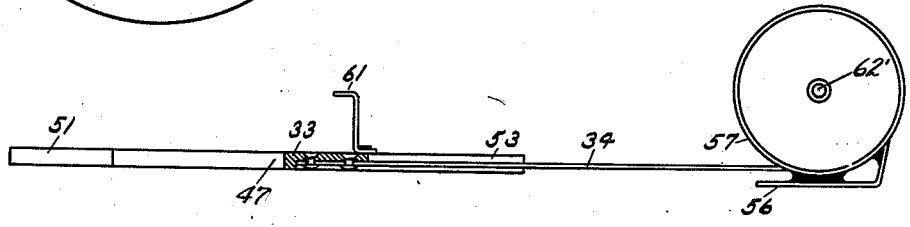
INVENTOR
VERNON I. WEIHE
BY
William D. Hall.
ATTORNEY Patented May 6, 1952

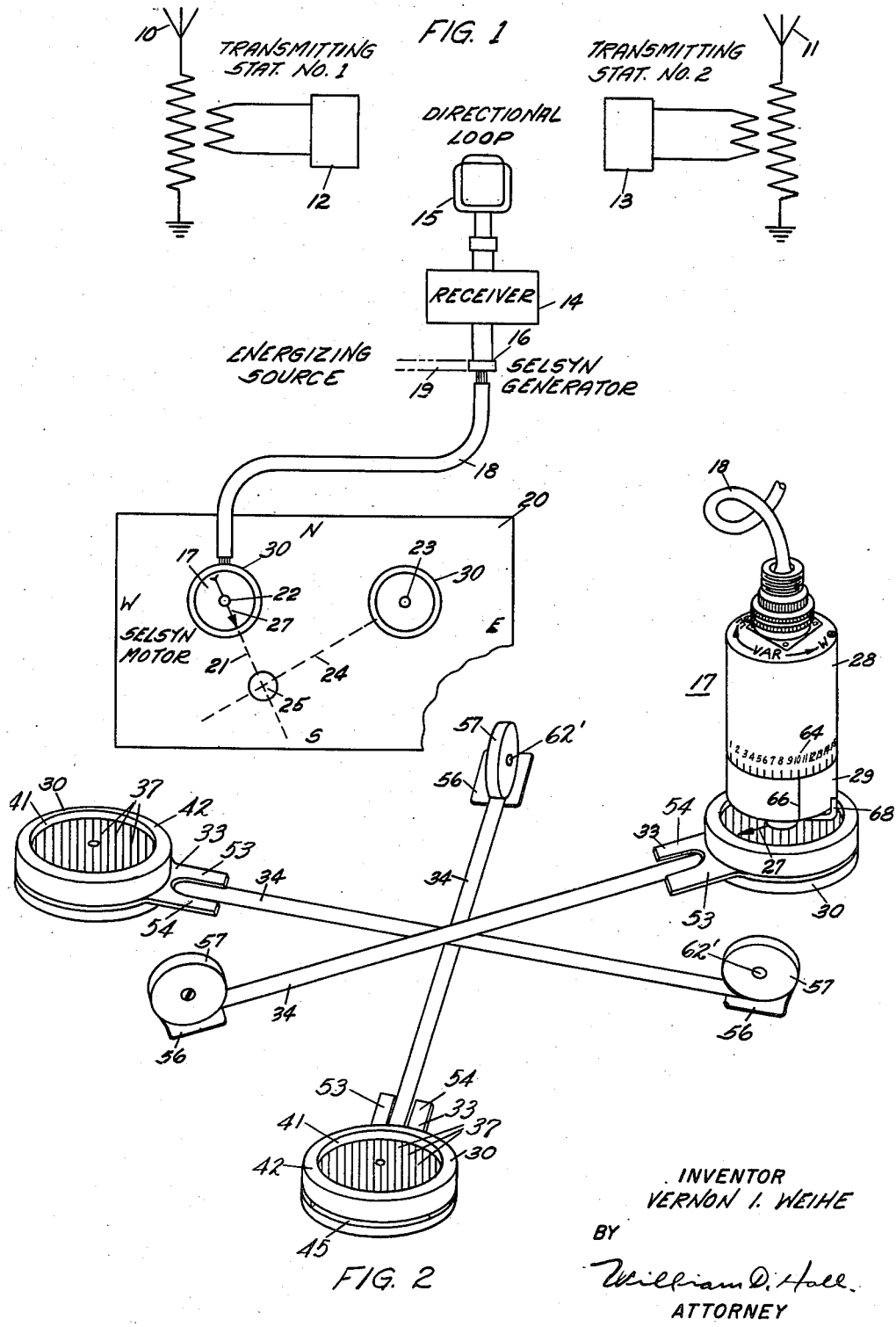

2,595,315

UNITED STATES PATENT OFFICE 2,595,315

DIRECTIONAL ANTENNA CONTROLLED CRAFT POSITION PLOTTING DEVICE

Vernon I. Weihe, Arlington, Va.

Continuation of application Serial No. 451,654, July 20, 1942. This application May 16, 1946, Serial No. 670,087

12 Claims. (Cl. 33—1)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to radio direction finding and to the apparatus that is to be used therewith to perform various plotting operations.

This application is a continuation of my abandoned application Serial No. 451,654, filed July 20, 1942.

One object of my invention is to provide a simple plotting system with simple apparatus for radio direction finding, that will obviate the necessity for extensive calculations that have been heretofore required.

Another object of my invention is to provide plotting equipment and devices that are compact and relatively light in weight, but that are comparatively accurate, and that are constructed to permit correcting adjustments to be made without the necessity for extensive computations that have been heretofore necessary.

It is a further object of my invention to provide a compact remote reading azimuth indicator adapted for transferring azimuth indication to any map at any desired points in rapid succession without mutilating the map.

It is a further object of my invention to provide a means for rapidly transferring radio bearings to a map in an airplane.

The construction of the plotting devices embodying this invention and the manner in which they are employed and utilized for a radio fix are illustrated in the accompanying drawings, in which:

Figure 1 is a schematic and diagrammatic view of a system in which a radio direction finder on a vehicle provides bearing indications toward two or more spaced radio transmitting stations in order to ascertain and to determine the "fix," or location, of the vehicle on which the radio direction finder is carried;

Figure 2 is a perspective view of a set of bases for the remote reading indicating apparatus that is employed in the system as a plotting device as they would appear applied to a support surface, on one of which the indicating device is positioned;

Figures 3 and 4 are, respectively, plan and vertical sectional views of a transparent plotter supporting base, of the plotting device in Figure 2, together with a self-winding measuring tape that constitutes the straight edge;

Figure 5 is a bottom view of the under surface of the transparent base, illustrating the parallel line markings and the locations of a centering pin and of three positioning pins for the base;

Figure 6 is a plan view of a yoke bracket and a flexible steel tape that is secured thereto; and Figure 7 is a side elevational view partly in section of the bracket and tape unit of Figure 6.

Figure 8:
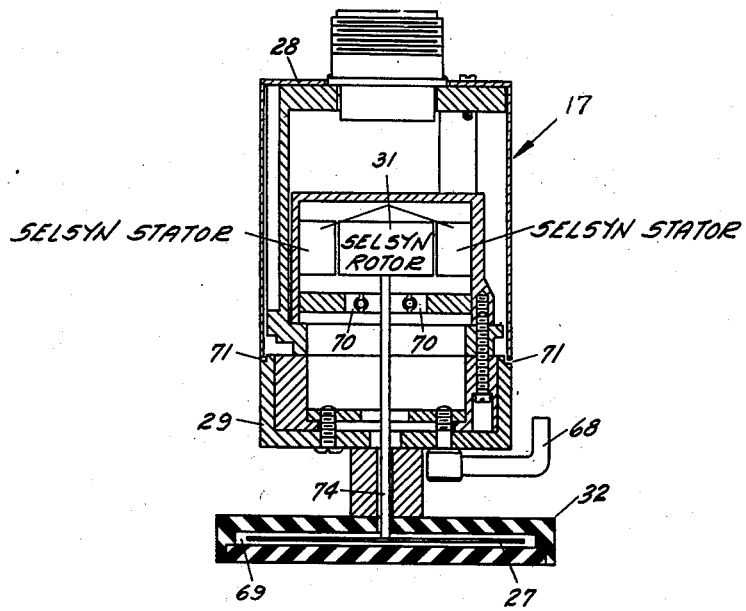
Figure 8 is a sectional view of the remote reading indicator of the radio direction finder.
Figure 9:
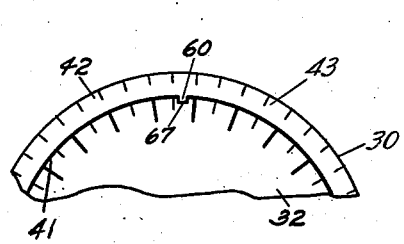
Figure 9 is a plan of fragmentary plan view of the plotter base and foot parts showing relation of key and keyway.

The system as illustrated in Figure 1, shows how the location of a moving vehicle, such as, for example, an aircraft, may be ascertained and determined on a map by reference to the known locations of the radiating antennae of two or more spaced radio transmitting stations, operating at respectively different frequencies.

For example, two spaced radio transmitting land stations are indicated and represented by the two antennae 10 and 11, respectively, supplied with radiating energy of different frequencies from their associated transmitting equipments 12 and 13. The two stations 10 and 11 are selected by the operator, or navigator of the airplane from among available known land station locations that would provide most suitable location bearings for the vehicle, with respect to the course that is to be traversed.

The bearing from the vehicle to each of the transmitting stations is procured by means of a radio direction finder 14 on the vehicle, that is provided with a directional loop antenna 15, which is rotatable about a vertical axis to ascertain the direction or bearing of a selected transmitting station 10 or 11 with reference to the airplane axis.

The movement of the directional loop antenna and its instantaneous position are transmitted to a remote point by means of a self-synchronous system, which includes a self-synchronous generator or transmitter 16, a self-synchronous receiver or indicator 17 which acts as a remote reading indicator of radio direction finder 14, and a connecting cable 18 of conductors electrically joining the self-synchronous generator 16 and the self-synchronous indicator 17. A source of energy 19 is connected to the rotor or energizing unit of self-synchronous generator 16.

Movement of the self-synchronous receiver or indicator 17 is utilized to provide an indication of the direction line, or bearing, to the transmitting station to which the radio direction finder 14 is tuned. A point of intersection between two bearing lines may be established, which will determine the "fix," or position, of the airplane with respect to these two transmitting stations.

In order to procure a geographical indication, or location, of the point of intersection of the two bearing lines, a map 20 is employed that contains the locations of the two transmitting stations and the course that is to be traversed by the vehicle on which the radio direction finder 14 is carried.

The procedure of establishing the two bearing lines consists in setting the indicator 17 down on the map over the point 22 marking the location of a radio station 10 to which the direction finder 14 is tuned with the origin of the indicator scale oriented on the map in the same direction as the airplane axis is oriented in space. The indicator pointer 27 then will have moved so as to point in the direction from the station 10 to the position of the airplane on the map. Hence a bearing line 21 plotted on the map in the direction in which the pointer points must pass through the point on the map corresponding to the location of the airplane. A repetition of the procedure using a station 11 having a different location (as, for instance, at 23 in Fig. 1) and frequency determines similarly another bearing line 24. The airplane fix is then determined on the map as the point of intersection 25 of the two bearing lines 21 and 24.

In order to impart significance to the bearing readings the azimuth scale of the indicator must be oriented with reference to a North-South line on the map so that the zero of the azimuth scale makes an angle with North-South line equal to the heading of the airplane from true North. When this is done the pointer 27 then makes an angle with the North-South line which is the azimuth of the airplane with respect to the radio station to which the direction finder is tuned.

The construction of the direction finder indicator 17, which is employed in this system, is illustrated in the Figures 2 to 9, inclusive.

As shown in Figures 2 and 8 the direction finder indicator 17 comprises a cylindrical housing 28 mounted on a center post 29 and free to turn on a bearing 71 (Fig. 8) about the axis of center post 29. To the bottom of center post 29 is rigidly attached a base or foot 32. This foot 32 is of transparent plastic, disc-shaped, and encloses a shallow cavity 69. The stator of a self-synchronous motor or receiver 31 is fixed to housing 28, while the rotor thereof is supported on bearings 70 coaxial with center post 29. The shaft 74 of the rotor passes down through an axial opening in center post 29 into cavity 69. The indicator pointer 27 attached to shaft 74 turns within cavity 69.

The circular edge of the foot 32 has engraved thereon an azimuth scale. In the edge of foot 32 there is cut a keyway 67 for use in aligning the indicator on the map 20, as will be explained below.

Around the rim of housing 28 there is engraved an azimuth scale 64 which moves against a fiducial mark 66 on centerpost 29 as housing 28 is rotated on bearing 71. This fiducial mark 66 is set to mark the same radial from the axis of centerpost 29 as does keyway 67 on foot 32.

A lock 68 is provided to lock housing 28 to centerpost 29 against further turning once the angular setting of housing 28 with respect to centerpost 29 has been made.

In addition to the peripheral side markings 64, the case or housing is marked on the top with two oppositely directed arrows and the associated symbols E and W to indicate the direction of angular adjustment to compensate for variations; the side markings 64 serving to indicate the equivalent extent of the adjustment. The variables thus involved include the magnetic variation of the compass for the locality where the vehicle is operating (if the direction finding apparatus includes an input component from a magnetic compass), and the deviation of the fore-and-aft axis of the vehicle from a true North-and-South line if, for instance, the map on the plotting table is fixed with its north side toward the head of the vehicle.

In a preferred embodiment, indicator 17 is not placed directly upon the map 20 but there are provided two or more movable supporting bases 30 shown in detail in Figures 3–5. These bases are to be fixed to the map over the positions of the radio stations on which bearings are to be taken. They serve to properly position and orient indicator 17 as it is placed about the map from station to station.

Each base 30 is preferably made of a transparent material, such as a cellulose derivative, for example, so the map may be seen through the base plate, thereby permitting the base to be properly located on the map. It simplifies such disposition for the base 30. The bottom surface 36 of the base is provided with a series of engraved parallel lines 37 permitting said lines to be properly aligned parallel to the North-South meridians on the map.

In order to permit each base to be properly positioned and centered at a selected geographical point on the map 20, each of said bases 30 is provided with a centering pin 38, and with three or more positioning or anchoring pins 39. The center pin 38 is slightly longer than the anchoring pins 39 to permit the base first to be positioned and centered properly, and then to be turned to establish the North-South alignment before the base is pressed home and held in the desired fixed position by the anchoring pins 39.

Each base 30 is further provided with a central shallow recess or step socket 41, which is encircled by a narrow annular ring, or rim 42, whose upper surface is marked with an azimuthal scale 43 throughout the entire circle. Recess 41 is dimensioned to receive snugly but removably foot 32 of indicator 17. A key 60 in rim 42 fits snugly into keyway 67 of foot 32 so that indicator 17 is locked automatically into orientation with reference to the map meridian when it is placed upon any properly positioned base 30.

Each base 30 is also provided with a concentric annular peripheral slot 45 (Fig. 4), to accommodate and receive the arms of a yoke 33 of Figures 6 and 7.

The yoke 33, as shown in Figures 6 and 7, constitutes a removable part in the form of a broken ring or fork with a central opening 46 of proper size and shape to permit the yoke to fit snugly about the body of the base 30, with the inner side surface 47 of the yoke engaging the inner side or wall 48 of the peripheral slot 45. The inner surface 48 of the slot, and the inner edge surface 47 of the yoke 33 coincide to constitute part of the circle whose center 49 falls on the central axis of the base 30 when yoke 33 and base 30 are assembled. The yoke 33 is therefore concentric with the base 30 throughout the movement of the yoke. The mouth or opening of the yoke is provided with two flat surfaces 51 and 52 that are spaced slightly less than the diameter of the inner circle of surface 48 so that when the open end of yoke 33 is presented in the slot 45 and pressed slidingly thereinto, it must be snapped into position, and will then be held yieldingly on the base 30 against casual displacement but manually withdrawable, the arms yielding by moderate pulling force applied manually to the yoke. This type of construction permits a yoke 33 and a tape 34 to be entirely removed if two plotting devices interfere with each other when spotted on the map, and be replaced so as to avoid crowding.

The yoke 33 is also provided with two backward extending arms 53 and 54, separated by a space 55, sufficient to receive and accommodate a flat base plate 56 on a shell or housing 57 for receiving the wound steel tape 34 when the tape is wound, and the shell, or housing 57 is moved to its terminal position adjacent to the back arms 53 and 54 of the yoke 33. The weight of shell 57 combined with that of its base plate 56 is sufficient to hold the tape extended in any position upon a map by reason of friction between the map surface and the bottom of base plate 56. The tape is held at a fixed extension by a lock, not shown, within shell 57, which is released when the tape is to be wound or unwound by pressure on a button 62'. As shown in Figure 6, one end 58 of the tape 34 is fixedly secured to the yoke 33 by suitable means as two rivets 59 in such manner that one edge 35 of the steel tape 34 will be in direct alignment with the center 49 of the yoke 33.

In order to more accurately align the edge 35 of the steel tape with pointer 27 of indicator 17 when seated on the base 30, a pointer 61 is fixedly secured to the yoke 33 by rivets 62 in such manner that one edge of the pointer 61 will be in direct alignment with the edge 35 of the tape and the center line through center of the yoke. The top of the pointer 61 extends up to and over the rim 42 of the transparent base 30, to a position permitting proper alignment of the pointer 61 with the indicating pointer 27 of indicator 17.

In operation of my device two or more bases 39 are placed upon a map 20 of the terrain over which the airplane course is to lie. As previously explained each of these bases is placed with centering pin 38 pricking the point on the map representing a radio station. Each base 30 is turned with its azimuth scale 43 to agree with a polar azimuth direction on the map and the lines 37 are aligned with the meridian on the map nearest the station. The base 30 is then pressed down upon the map and held in place by the anchoring pins 39. It is to be observed that my system permits the ready use of a map in which the meridians are not parallel; this is a common form of map.

In order to obtain a fix the heading of the airplane is determined and is held fixed during the subsequent observations, which should be made in as rapid succession as possible. The heading may be read on a magnetic or gyro compass. The airplane heading is set into indicator 17 by turning housing 28 to bring the fiducial mark 66 on center post 29 against the proper azimuth point on azimuth scale 64 on housing 28. The effect of this is to add the airplane heading from north onto all the readings of the radio direction finder indicator. Once the heading has been set into the indicator, the setting is locked in by means of lock 68.

The indicator 17 is then seated upon a first base 30 which is centered upon the position on the map of a first radio station. Direction finder 14 is then tuned and oriented to the station concerned. The needle 27 of indicator 17 thereby turns automatically so as to point from the station to the airplane position on the map. Yoke 33 is then turned by hand so that pointer 61 is aligned with needle 27. Tape 34 is then unwound and left in position during the remainder of the observation.

The construction by which pointer 61 is brought almost in contact with needle 27 makes possible the transfer of angle reading from indicator 17 to tape 34 and to the map with a minimum of error. When aligned the tip of pointer 61 nearly touches the tip of needle 27. It is proposed to call this method of alignment, alignment by coincidence.

Indicator 17 is next removed from the first base 30 and placed on a second base 30, which marks the location of a second radio station on the map. Radio direction finder 14 is then tuned and oriented to this second station. Yoke 33 of the second base 30 is turned to the direction now indicated by needle 27, which is the direction from the second station to the airplane. The tape 34 is unwound upon a map, and the point of intersection of its edge 35 with the edge 35 of the first tape 34 marks the location of the airplane on the map 20.

The advantages of the simplicity of the present invention become apparent from consideration of the factors necessary to take and to plot a radio bearing in aircraft, namely:

a. Station
b. Frequency
c. Time of bearing
d. Indicated relative bearing
e. Radio compass deviation
f. Corrected relative radio bearing (from d & e)
g. True heading
h. True bearing of station from plane (from f & g)
i. Mercator correction
j. Mercator bearing of station from plane (from h & i)
k. ±180° for reciprocal bearing
l. Mercator bearing of plane from station The device herein described eliminates the above calculations and observations d, f, h, j, and k. Bearing of plane from station (1) is obtained by satisfying the conditions a, b, c, g, and i. Correction for e is accomplished automatically in standard U. S. Army radio compass equipment, and i is neglected except for bearings of several hundred miles or more.

The transparent bases by reason of their transparency do not interfere with normal use of the map.

The graduated folding or winding rules show approximate distances along each bearing line, and permit the use of a multiplicity of plotter bases without the interference which would result from the use of rigid straight edges. However, it is within the scope of my invention to use rigid straight edges where preferred.

The plotter bases are usable alone as manual plotting devices or as movable compass roses with graduated straight edge. Their use alone is very practicable as the result of their (1) transparency, (2) compactness, (3) light weight, and (4) desirable length, and utility of the extended graduated scale.

The special apparatus used in my system, namely, the bases, plotter and rules may be made very compact, so as to be readily stored away in an airplane when not in use. No special map is required and no special table on which to lay the map.

In accordance with the provisions of the patent statutes I have herein described the apparatus and principles of operation of my invention, but I desire to have it understood that the apparatus shown is only illustrative and that the invention may be carried out by other means. Also, while it is designed to use the various features and elements in the combination and relations described, some of these may be altered and others omitted without interfering with the more general results outlined, and the invention extends to such use.

I claim:

1. A navigation plotting device comprising, a transparent protractor supporting base provided with parallel line markings on the central area and with an azimuth scale around the rim, a self-synchronous receiver unit adapted to be removably and coaxially supported on said base, said receiver unit embodying a stator winding, a rotor free to orient itself with respect to a magnetic flux field to be set up by the stator winding and an indicating pointer on the rotor to indicate the rotor position relative to the azimuth scale on said base, a housing for said receiver unit, positioning means on said housing coupling with said base to assure and to maintain proper azimuthal alignment of said housing and base, a movable peripheral bracket fitting into a concentric annular slot disposed peripherally around the rim of said base, the bracket having secured thereto an inwardly directed pointer for alignment with the indicating pointer, and a self-winding tape measure fixed to said bracket with one edge of the tape measure radially aligned with the pointer axis and with the center of said base, so that said tape measure edge will constitute a radius and bearing line through the center of said base.

2. A navigation plotting device comprising a transparent circular protractor supporting base provided with parallel line markings on the central area and with an azimuth scale around the rim, a center post removably secured coaxially and in fixed orientation to the base, a self-synchronous receiver coaxially supported on the center post, said receiver comprising a rotor with an indicating pointer suspended therefrom coaxial with the base to indicate the position of the rotor relative to said azimuth scale, a straight-edge, and means to pivotally and radially connect said straight-edge to the base and provided with a pointer that is alignable with the indicating pointer of the rotor to permit the straight-edge to be directly aligned with the indicating pointer.

3. Navigation plotting apparatus comprising, a transparent circular base provided with a center positioning pin and at least one anchoring pin to hold said base as positioned, a measuring tape having one end removably secured to said base and pivotally disposed relative to the center of said base with one edge of said tape radially aligned with the center of said base, a remote registering azimuth indicator, said indicator including a rotor and an indicating pointer to indicate its position, means on the base and the indicator for permitting said indicator to be removably placed and azimuthally oriented on said base, and aligning means whereby the tape is aligned with the indicating pointer to establish a line of bearing.

4. A navigation plotting device comprising a transparent base having a central positioning pin and at least one co-operating anchoring pin secured thereto, a shallow concentric recess on the top thereof to accommodate a direction indicator in unique angular relation thereto and a peripheral annular concentric slot, a bracket shaped as a bifurcated yoke to fit into the annular slot of said base and with the central opening of the yoke having a circular contour adapted to closely fit the annular slot of the base so that the yoke will be concentrically angularly adjustable around the base, and a flexible measuring tape secured to the bracket to measure from the center of the base, one edge of the tape providing an extension of a radius of the base.

5. A navigation plotting device as defined in claim 4, including a pointer located within the shallow recess of said base to provide, with the center of the base, a locus for a line of bearing to be laid out by the edge of the tape, and said direction indicator including means for controlling the position of the pointer to establish a direction line to a point whose position or bearing is to be ascertained.

6. Plotting apparatus for a map, including a map-engaging supporting base positionable selectively upon a precise point of said map, and including a center axis means to fix the base in precise angular position relative to a polar direction at the selected point as a center of rotation, a remote reading azimuth indicator having a body stator part concentric with said center axis and a concentric remotely controlled direction-indicating rotor, said base and body stator having separable socket and key means coaxial with said center axis means and said rotor constructed to allow said indicator body stator part to be removably set upon and lifted at will from said base, said socket and key means constructed to hold the stator part in precise orientation relative to said base and map, and discrete coincidence means on said base for transferring the azimuth reading of the indicator fixedly onto the map as a line member extending from adjacent and aligned with said selected point across the map.

7. A navigation plotting device comprising a transparent supporting base with a circular protractor marking, a revoluble bracket thereon rotatable about the axis of the base and having a radial fork having horizontally spaced bifurcations spaced above and parallel to the plane of the bottom face of the base, and a straight edge element consisting of a reel case having a flat base plate slidable under said furcations close to said base, said case adapted to lie over said furcations, and an extensible tape reelable in the case and having its extremity attached to said bracket extending across said marking on the base.

8. A navigation plotting device comprising a transparent base plate with a circular protractor marking, said plate having a top socket therein concentric with said marking, to receive freely and separably stepped therein a remotely controlled pointer, means on the plate constituting a circular body concentric with the protractor scale, a semi-flexible resilient arcuate bracket around and rotatable freely on said body, its opening being of less width at its entrance than the diameter of the said body, and manually and slidably removable therefrom by virtue of its flexibility, and a straight-edge element consisting of a windable steel tape having its free end secured to said arcuate bracket in such manner that one edge of the steel tape is in alignment with the center of the base plate, and a winding device attached to the tape and movable therealong to and from the base.

9. A navigation plotting device as defined in claim 4, including said direction indicator, the latter comprising a pointer rotatable within the shallow recess to provide, with the center of said base, a locus for a line of bearing to be laid out by the edge of the tape.

10. In a radio controlled direction indicator for navigational use on maps and the like, a plurality of separate independently movable supporting bases, means on said bases to separably attach them to the face of a map or the like at points on the map selected at will corresponding to geographical positions of respective radio transmitters, a motor having a rotor responsive to electrical azimuth data separably and alternatively mounted on one of said bases, a direction line member on each said base extendable to form a bearing line from the base in accordance with a position of said rotor when the motor is set on the base, and mounting means on each base constructed so that the motor may be placed upon one of the bases an azimuth bearing line obtained and then moved to another of said bases to obtain another azimuth bearing line, with a single motor instrument, and the several bearing indications retained on the map by said line members after removal of said motor, whereby the intersection of two such bearing lines will present the geographical position at the point of observation.

11. In a radio direction finding position indicating and position plotting apparatus, a plurality of transparent bases, each provided with securing means to separably engage a map, a bracket coaxially and pivotally supported on each said base, each bracket provided with a self-winding tape having one end revolubly secured to the bracket so that one edge of the tape is aligned radially with the center of said base, a pointer device separably mounted coaxially on said base responsive to directional control data electrically transmitted thereto, said pointer device adapted to be placed in turn at will on each of said bases to establish at each base a directional indication of a bearing line from data transmitted to said pointer device and means for holding each of said tapes in extended position so that extended tapes may represent lines of bearing to mutually determine a geographical location on a map.

12. A navigation plotting device for determining positions of a craft on a map, comprising a substantially flat transparent base member having a center indicating element at its underside, and having a broad socket recess in its upper side concentric with said center indicating element, said recess having a key part therein, a direction indicating self-synchronous receiver unit separably engaged with the base comprising a foot member shaped to fit and liftably set in said recess with the unit in stable equilibrium, liftable at will therefrom, and having a key part coengaged with the first named key part at a predetermined angular position of the foot member around said center indicating element on the base, one of said two named members at least having an azimuth indication thereon, a self-synchronous motor mounted on said foot member on a vertical axis coincident with said center indicating element and including a stator adjustable angularly on the foot member around said axis, means on the foot member and stator to indicate azimuth positions of the two relatively to each other, means to secure the stator releasably in adjusted azimuth positions on the foot member, and an azimuth indicating pointer connected with the rotor movable therewith adjacent the foot member.

VERNON I. WEIHE.

REFERENCES CITED

The following references are of record in the file of this patent:

UNITED STATES PATENTS

| Number | Name | Date |
|---|---|---|
| 1,350,273 | Fisher | Aug. 17, 1920 |
| 1,442,947 | House | Jan. 23, 1923 |
| 1,543,061 | Danielson | June 23, 1925 |
| 1,638,914 | Brush | Aug. 16, 1927 |
| 1,770,829 | Bailey | July 15, 1930 |
| 1,850,640 | Sperry et al. | Mar. 22, 1932 |
| 1,868,726 | Collier | July 26, 1932 |
| 2,043,336 | Sjostrand | June 9, 1936 |
| 2,055,281 | Dulczewski | Sept. 22, 1936 |
| 2,085,059 | Woodside | June 29, 1937 |
| 2,191,730 | Sjostrand | Feb. 27, 1940 |
| 2,278,440 | Graves | Apr. 7, 1942 |
| 2,299,083 | Elm | Oct. 20, 1942 |
| 2,307,029 | Elm | Jan. 5, 1943 |
| 2,361,956 | Moseley | Nov. 7, 1944 |
| 2,408,357 | Wolfe | Sept. 24, 1946 |